United States Patent
Kunieda et al.

(10) Patent No.: US 9,509,105 B2
(45) Date of Patent: Nov. 29, 2016

(54) CONNECTOR STRUCTURE

(71) Applicant: SMK Corporation, Tokyo (JP)

(72) Inventors: Hironori Kunieda, Tokyo (JP); Ryo Sasaki, Chiba (JP); Ryutaro Takano, Tokyo (JP); Taku Akaiwa, Kanagawa (JP); Wataru Iwasaki, Tokyo (JP); Masayoshi Kashima, Tokyo (JP)

(73) Assignee: SMK CORPORATION, Tokyo (JP)

( * ) Notice: Subject to any disclaimer, the term of this patent is extended or adjusted under 35 U.S.C. 154(b) by 0 days.

(21) Appl. No.: 14/667,616

(22) Filed: Mar. 24, 2015

(65) Prior Publication Data

US 2015/0325964 A1 Nov. 12, 2015

(30) Foreign Application Priority Data

May 8, 2014 (JP) .................................. 2014-96778

(51) Int. Cl.

| H01R 24/38 | (2011.01) |
| H01R 24/50 | (2011.01) |
| H01R 13/11 | (2006.01) |
| H01R 13/50 | (2006.01) |
| H04N 5/225 | (2006.01) |
| H01R 103/00 | (2006.01) |

(52) U.S. Cl.
CPC ............. *H01R 24/38* (2013.01); *H01R 13/111* (2013.01); *H01R 13/50* (2013.01); *H01R 24/50* (2013.01); *H01R 2103/00* (2013.01); *H04N 5/2252* (2013.01)

(58) Field of Classification Search
CPC .... H01R 24/38; H01R 13/50; H01R 13/514; H01R 2103/00; H04N 5/2252
See application file for complete search history.

(56) References Cited

U.S. PATENT DOCUMENTS

| 5,074,809 A * | 12/1991 | Rousseau | ............... H01R 24/44 439/578 |
| 5,516,303 A * | 5/1996 | Yohn | .................. H01R 13/6315 439/248 |
| 6,174,193 B1 * | 1/2001 | Nagano | ................ H01R 13/506 439/468 |

(Continued)

FOREIGN PATENT DOCUMENTS

JP    2004-22530 A    1/2004

OTHER PUBLICATIONS

Extended European Search Report for European Patent Application No. 15 160 471.7, issued by the European Patent Office on Sep. 15, 2015.

(Continued)

*Primary Examiner* — James Harvey
*Assistant Examiner* — Oscar C Jimenez

(57) ABSTRACT

A receptacle, fixed to a first case, has a central conductor portion, an outer conductor portion that concentrically surrounds the central conductor portion, and a receptacle-side convex portion that extends in a connector circumferential direction and is formed on a top end portion of the outer conductor portion. A plug, fixed to a second case, has a plurality of inner contact pieces that make contact with an outer peripheral surface of the central conductor portion with fitting into the receptacle, a plurality of outer contact pieces that extend in a connector axial direction on an outer peripheral surface of the outer conductor portion with intervals therebetween, and plug-side convex portions that are freely displaceable in the connector axial direction in a state of being in surface contact with the outer peripheral surface of the outer conductor portion and are formed on the outer contact pieces of the plug.

9 Claims, 5 Drawing Sheets

(56) References Cited

U.S. PATENT DOCUMENTS

| | | | | |
|---|---|---|---|---|
| 6,468,113 B1* | 10/2002 | Murakami | H01R 13/4364 | 439/274 |
| 8,011,977 B2* | 9/2011 | Tsuruta | H01R 13/4365 | 439/752 |
| 8,616,522 B2* | 12/2013 | Weldon | F02D 9/1055 | 251/129.11 |
| 8,998,639 B2* | 4/2015 | Kida | H01R 13/46 | 439/569 |
| 2006/0024985 A1 | 2/2006 | Nagata et al. | | |
| 2008/0268705 A1 | 10/2008 | Yamane | | |
| 2013/0242099 A1* | 9/2013 | Sauer | H04N 5/2251 | 348/148 |
| 2013/0293771 A1 | 11/2013 | Mori et al. | | |

OTHER PUBLICATIONS

Office Action issued for counterpart Japanese Application 2014-096778, issued by the Japan Patent Office on Apr. 5, 2016.

* cited by examiner

CONNECTOR STRUCTURE

CROSS REFERENCE TO RELATED APPLICATION

The contents of the following Japanese patent application are incorporated herein by reference,
NO. 2014-96778 filed on May 8, 2014.

FIELD

The present invention relates to a connector structure.

BACKGROUND

Conventionally, an imaging device has been known which is provided with a first case having a lens member attached to one end thereof and an opening at the other end thereof, a substrate accommodated in the first case, the substrate having a female terminal which is electrically connected to an imaging element, a second case assembled to the first case so as to close the opening of the first case, and a male terminal that is mounted on the second case so as to be electrically connected to the female terminal when the second case is assembled to the first case. In the imaging device, a connector is formed by the male terminal and the female terminal (refer to Patent Literature 1, for example).

Further, in recent years, to improve the data transmission speed from a lens unit disposed inside the imaging device to an image processing unit disposed outside the imaging device, consideration has been made to use a single coaxial cable to transmit operating power and a control signal from the image processing unit to the lens unit and also to adopt power supply superposition that is used to transmit an image signal from the lens unit to the image processing unit.

As a related connector that is used to electrically connect the coaxial cable and the lens unit, an SMB connector as shown in FIG. 5 is provided. An SMB connector 101 in FIG. 5 has a receptacle 103 that is mounted on a substrate 102 and a plug 104 that is electrically attached to a coaxial cable, which is not shown in the drawings, and is fitted into the receptacle 103.

The receptacle 103 has a needle-shaped central conductor portion 103a, a tubular outer conductor portion 103b that concentrically surrounds the central conductor portion 103a, and an insulator 103c that electrically insulates the central conductor portion 103a from the outer conductor portion 103b. In the receptacle 103, a groove portion 103d is formed to extend in a connector circumferential direction on an outer peripheral surface of the outer conductor portion 103b.

The plug 104 has a plurality of inner contact pieces 104a that make contact with an outer peripheral surface of the central conductor portion 103a when the plug 104 is fitted into the receptacle 103, a plurality of outer contact pieces 104b that extend in a connector axial direction along the outer peripheral surface of the outer conductor portion 103b when the plug 104 is fitted into the receptacle 103, an insulator 104c that electrically insulates the inner contact pieces 104a from the outer contact pieces 104b, and a tubular housing portion 104d that surrounds the plurality of outer contact pieces 104b in a circumferential direction. In the plug 104, bent portions 104e are formed on the outer contact pieces 104b to be fitted into the groove portion 103d.

An inner conductor of the coaxial cable, which is not shown in the drawings, is electrically connected to the inner contact pieces 104a of the plug 104 and an outer conductor of the coaxial cable, which is not shown in the drawings, is electrically connected to the outer contact pieces 104b of the plug 104. When the plug 4 is fitted into the receptacle 103, the inner conductor of the coaxial cable becomes conductive to the central conductor portion 103a via the inner contact pieces 104a and the outer conductor of the coaxial cable becomes conductive to the outer conductor portion 103b via the outer contact pieces 104b and the bent portions 104e.

CITATION LIST

Patent Literature

Patent Literature 1: Japanese Patent Application Laid-Open No. 2013-210480.

SUMMARY

Technical Problem

However, for example, when a configuration is adopted in which the receptacle 103 is fixed to a first member, which is not shown in the drawings, and the plug 104 is fixed to a second member, which is assembled to the first member and is not shown in the drawings, the above-described SMB connector 101 encounters a problem in which, when an assembly tolerance of the first member and the second member in the connector axial direction is large, a state arises in which the bent portions 104e of the outer contact pieces 104b do not fit into the groove portion 103d of the outer conductor portion 103b, and consequently, the electrical connection between the receptacle 103 and the plug 104 becomes uncertain.

Further, when a clearance, which is formed in a direction orthogonal to the connector axial direction, is not provided in a section in which the second member is assembled to the first member, a relative position of the second member with respect to the first member is determined in priority to the fitting of the receptacle 103 and the plug 4. Therefore, when the tolerance of the first member and the second member is large in the direction orthogonal to the connector axial direction, the receptacle 103 and the plug 104 result in being fitted together in a state in which an axis of the receptacle 103 and an axis of the plug 104 are misaligned with each other by an amount equivalent to the above-described tolerance. In other words, a state is obtained in which the receptacle 103 and the plug 104 are not arranged coaxially with each other. As a result of this, a problem occurs in which original impedance characteristics are impaired and good signal transmission characteristics cannot be obtained.

The present invention has been made to solve the above-described problem and it is an object of the present invention to provide a connector structure that is capable of reliably connecting a receptacle and a plug electrically and obtaining good signal transmission characteristics even when an assembly tolerance of a first member, to which the receptacle is fixed, and of a second member, to which the plug is fixed, is large in a connector axial direction and in a direction orthogonal to the connector axial direction.

Solution to Problem

To achieve the above-described object, a connector structure according to the present invention includes: a receptacle that is fixed to a first member; and a plug that is fixed to a second member and is fitted into the receptacle, with the second member being assembled to the first member. The receptacle has a central conductor portion, a tubular outer conductor portion that concentrically surrounds the central conductor portion, and a receptacle-side convex portion that extends in a connector circumferential direction and is formed on a top end portion of the outer conductor portion. The plug has a plurality of inner contact pieces that make contact with an outer peripheral surface of the central conductor portion when the plug is fitted into the receptacle, a plurality of outer contact pieces that extend in a connector axial direction on an outer peripheral surface of the outer conductor portion with intervals therebetween, and plug-side convex portions that are freely displaceable in the connector axial direction in a state of being in surface contact with the outer peripheral surface of the outer conductor portion and are formed on the outer contact pieces. A clearance is formed between the first member and the second member in a direction orthogonal to an axis of the receptacle. The second member is assembled with the first member within a range in which the second member is freely displaceable in the connector axial direction.

In the connector structure with this configuration according to the present invention, when the plug is fitted into the receptacle, the plug-side convex portions of the outer contact pieces move in the connector axial direction while maintaining a state of being in surface contact with an outer peripheral surface of the outer conductor portion, and according to a magnitude of an assembly tolerance of the first member and the second member in the connector axial direction, relative positions of the plug-side convex portions with respect to the connector axial direction of the outer conductor portion are determined. Hence, with the connector structure according to the present invention, it is possible to reliably connect the receptacle and the plug electrically and obtain good signal transmission characteristics even when the assembly tolerance of the first member and the second member in the connector axial direction is large.

Further, with the connector structure according to the present invention, when an operator manually pushes the plug into the receptacle to fit the plug into the receptacle, a reaction force transmitted to the operator after the plug-side convex portions have passed over the receptacle-side convex portion is smaller than a reaction force transmitted to the operator during a period before the plug-side convex portions of the outer contact pieces pass over the receptacle-side convex portion of the outer conductor portion. Hence, with the connector structure according to the present invention, the operator can determine whether or not the receptacle and the plug have been reliably connected electrically.

In the connector structure with the above-described configuration, it is preferable to have a structure in which, after the receptacle and the plug are fitted together in a coaxial state, while maintaining the state, the first member and the second member are fixed to each other.

In the connector structure with this configuration according to the present invention, relative positions of the first member and the second member in a direction orthogonal to the connector axial direction are determined in a state in which the receptacle and the plug are fitted together and arranged coaxially. Hence, with the connector structure according to the present invention, no increase of impedance arises due to misalignment between the receptacle and the plug and good signal transmission characteristics can be obtained.

According to the present invention, it is possible to provide a connector structure that is capable of reliably connecting a receptacle and a plug electrically and obtaining good signal transmission characteristics even when an assembly tolerance of a first member, to which the receptacle is fixed, and a second member, to which the plug is fixed, is large in a connector axial direction and in a direction orthogonal to the connector axial direction.

DESCRIPTION OF EMBODIMENTS

A connector structure according to an embodiment of the present invention will be described below with reference to the accompanying drawings.

Figure 1:
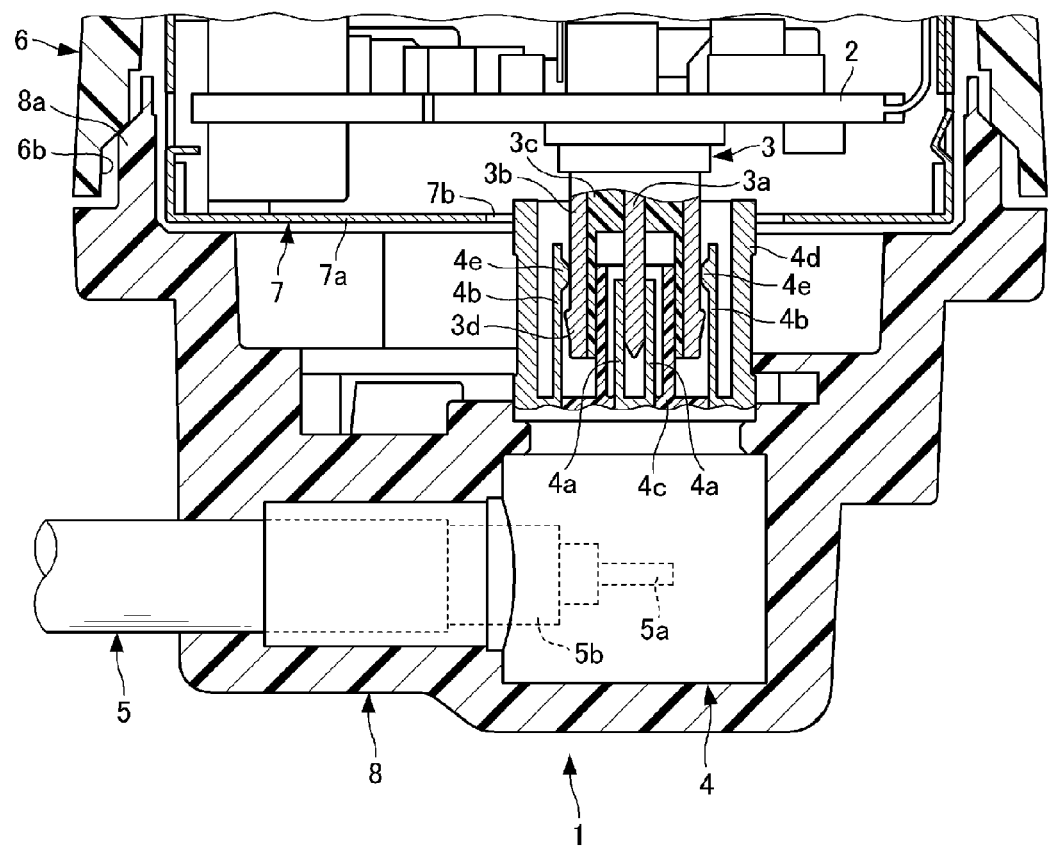
FIG. 1 is a cross-sectional view illustrating essential parts of an in-vehicle camera to which a connector structure according to an embodiment of the present invention is applied.

As illustrated in FIG. 1, the connector structure according to this embodiment is applied to an in-vehicle camera 1. The connector structure has a receptacle 3 that is mounted on a substrate 2, which constitutes an electronic circuit, and a plug 4 that is fitted into the receptacle 3.

The receptacle 3 has a needle-shaped central conductor portion 3a that protrudes perpendicularly with respect to the substrate 2, a tubular outer conductor portion 3b that concentrically surrounds the central conductor portion 3a, and an insulator 3c that electrically insulates the central conductor portion 3a from the outer conductor portion 3b. In the receptacle 3, a receptacle-side convex portion 3d extending in a connector circumferential direction is formed on a top end portion of the outer conductor portion 3b. The receptacle-side convex portion 3d has a truncated conical surface shape having an outer diameter that gradually expands from the top end portion of the outer conductor portion 3b toward the substrate 2 and then suddenly contracts on the substrate 2 side.

The plug 4 includes: two inner contact pieces 4a that, when the plug 4 is fitted into the receptacle 3, make contact with an outer peripheral surface of the central conductor portion 3a while positioning the central conductor portion 3a therebetween in a radial direction; four outer contact pieces 4b that, when the plug 4 is fitted into the receptacle 3, surround the outer conductor portion 3b in a circumferential direction on an outer peripheral surface of the outer conductor portion 3b with a gap therebetween and extend in a connector axial direction; an insulator 4c that electrically insulates the inner contact pieces 4a from the outer contact pieces 4b; and a tubular housing portion 4d that surrounds the four outer contact pieces 4b in the circumferential direction. Further, plug-side convex portions 4e are formed on the outer contact pieces 4b. The plug-side convex portions 4e are freely displaceable in the connector axial direction in a state of being in surface contact with the outer peripheral surface of the outer conductor portion 3b.

In the plug 4, an inner conductor 5a of a coaxial cable 5 is electrically connected to the inner contact pieces 4a and an outer conductor 5b of the coaxial cable 5, which is not shown in the drawings, is electrically connected to the outer contact pieces 4b. When the plug 4 is fitted into the receptacle 3, the inner conductor 5a of the coaxial cable 5 becomes conductive to the central conductor portion 3a via the inner contact pieces 4a and the outer conductor 5b of the coaxial cable 5 becomes conductive to the outer conductor portion 3b via the outer contact pieces 4b and the plug-side convex portions 4e.

Figure 2:
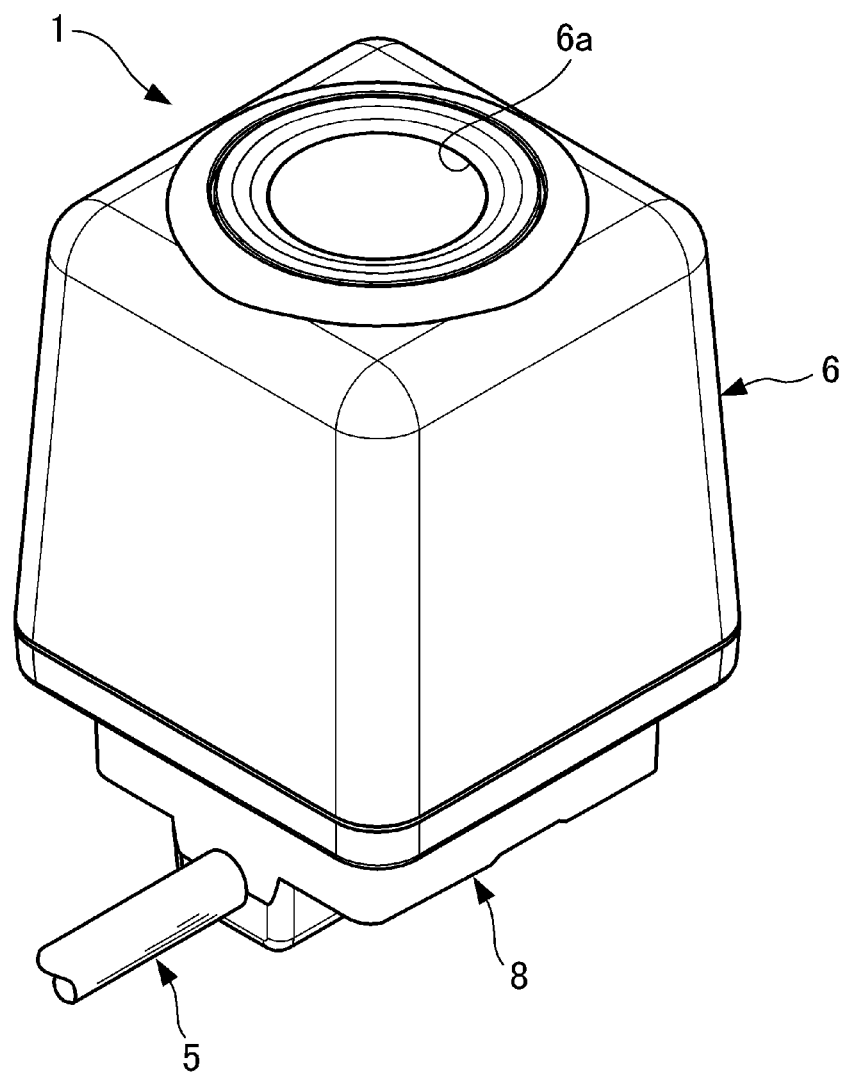
FIG. 2 is a perspective view of the entire in-vehicle camera to which the connector structure according to the embodiment of the present invention is applied.
Figure 3:
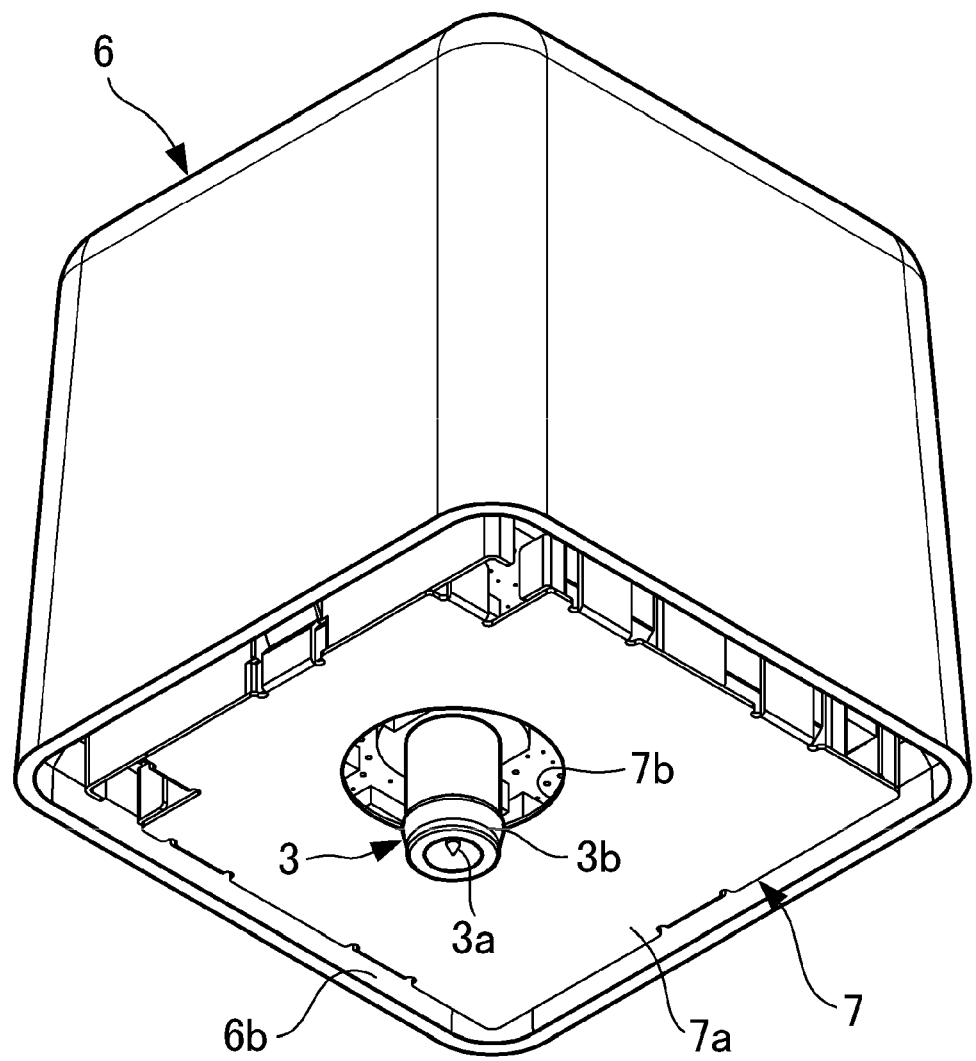
FIG. 3 is a perspective view illustrating a first case and a lens unit of the in-vehicle camera to which the connector structure according to the embodiment of the present invention is applied.
Figure 4:
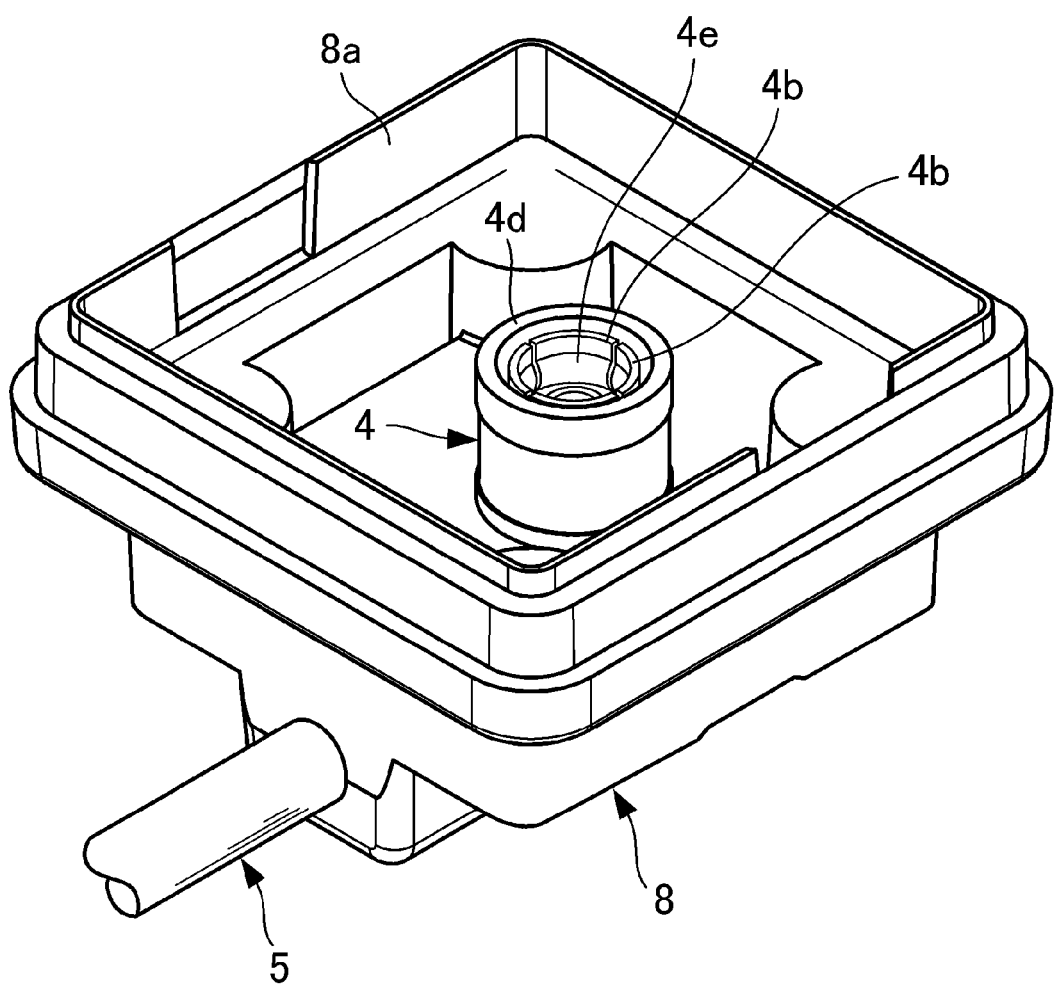
FIG. 4 is a perspective view illustrating a second case of the in-vehicle camera to which the connector structure according to the embodiment of the present invention is applied.
Figure 5:
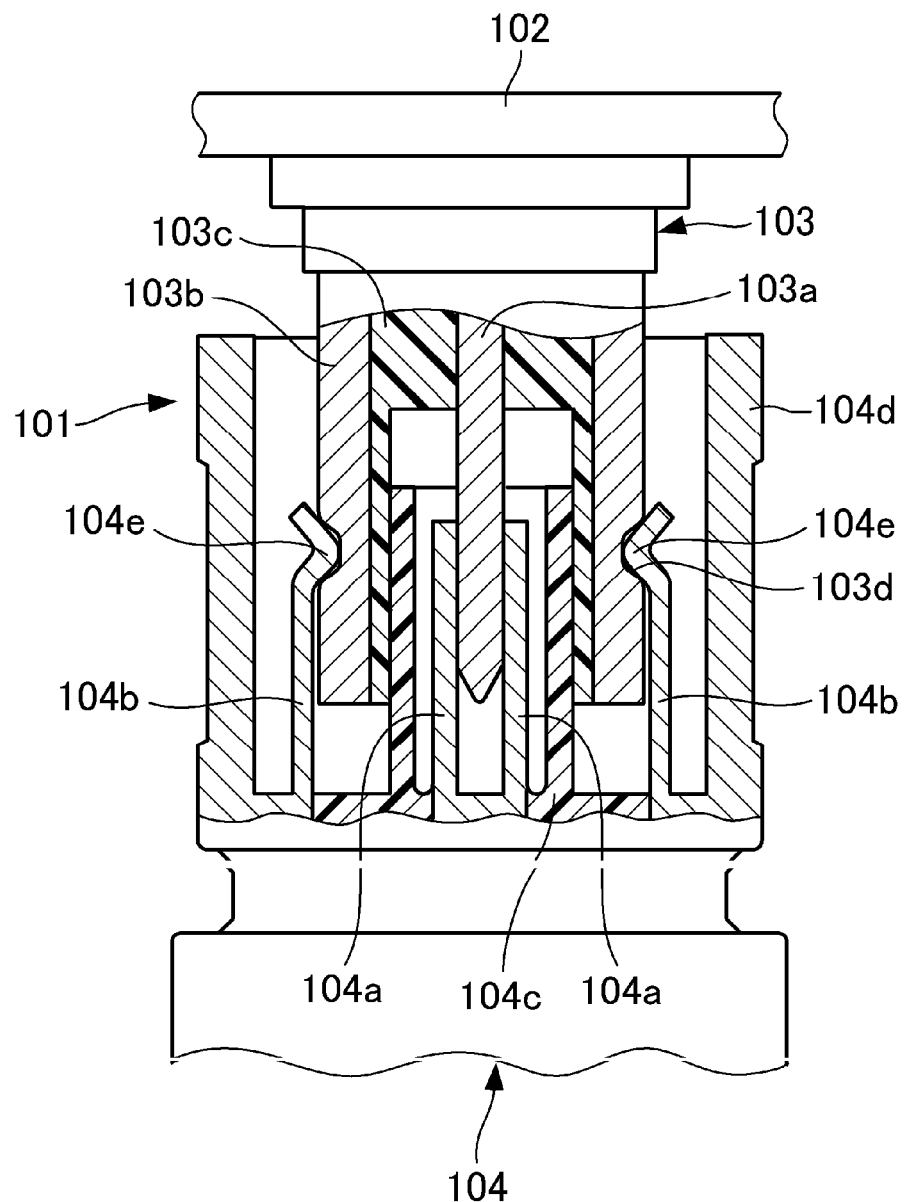
FIG. 5 is a cross-sectional view illustrating essential parts of a related SMB connector.

As shown in FIG. 2 to FIG. 4, the in-vehicle camera 1 has a first case 6 that has a lens window portion 6a at one end thereof and a unit insertion opening 6b at the other end thereof, a lens unit 7 that is accommodated in the first case 6 from the unit insertion opening 6b, and a second case 8 that has a guide portion 8a, which is fitted into the unit insertion opening 6b, to close the unit insertion opening 6b. Here, the first case 6 corresponds to a first member in the connector structure according to the present invention and the second case 8 corresponds to a second member in the connector structure according to the present invention.

As shown in FIG. 1 and FIG. 3, the lens unit 7 has a shielding case 7a formed from a metal plate, and the substrate 2 is accommodated in the shielding case 7a. The central conductor portion 3a and the outer conductor portion 3b of the above-described receptacle 3 protrude to the outside of the shielding case 7a from a receptacle protrusion opening 7b that is formed in the shielding case 7a. Further, the lens unit 7 is fitted into the first case 6 so that the central conductor portion 3a and the outer conductor portion 3b of the receptacle 3 protrude to the outside of the first case 6 from the unit insertion opening 6b. The receptacle 3 is thus fixed to the first case 6, which corresponds to the first member, via the substrate 2 and the lens unit 7.

As shown in FIG. 1 and FIG. 4, the second case 8 integrally encompasses part of the plug 4 and a end section of the coaxial cable 5. The part of the plug 4 is a part excluding the inner contact pieces 4a, the outer contact pieces 4b, the insulator 4c and the housing portion 4d. The plug 4 is thus fixed to the second case 8 that corresponds to the second member.

As shown in FIG. 1, in the first case 6 and the second case 8, when the plug 4 is fitted into the receptacle 3, the guide portion 8a of the second case 8 is fitted into the unit insertion opening 6b of the first case 6, so that the unit insertion opening 6b is closed by the second case 8. Here, a clearance that is directed in a direction orthogonal to the connector axial direction is formed at a fitting section of the first case 6 and the second case 8, and within a range of the clearance, changes in relative positions between the first case 6 and the second case 8 can be allowed. After the plug 4 has been fitted into the receptacle 3, the first case 6 and the second case 8 are fixed to each other by ultrasonic bonding or using an adhesive so that water tightness is secured around the whole circumference of the fitting section. Accordingly, the relative positions in the direction orthogonal to the connector axial direction are determined while maintaining a state in which the receptacle 3 and the plug 4 are fitted together in a coaxial state.

In the connector structure according to this embodiment, when the plug 4 is fitted into the receptacle 3, the plug-side convex portions 4e of the outer contact pieces 4b move in the connector axial direction while maintaining a state of being in surface contact with the outer peripheral surface of the outer conductor portion 3b, and according to the magnitude of the assembly tolerance of the first case 6 and the second case 8 in the connector axial direction, relative positions of the plug-side convex portions 4e with respect to the connector axial direction of the outer conductor portion 3b are determined. Hence, with the connector structure according to this embodiment, it is possible to reliably connect the receptacle 3 and the plug 4 electrically even when the assembly tolerance of the first case 6 and the second case 8 in the connector axial direction is large.

With the connector structure according to this embodiment, when an operator manually pushes the plug 4 into the receptacle 3 to fit the plug 4 into the receptacle 3, a reaction force transmitted to the operator after the plug-side convex portions 4e have passed over the receptacle-side convex portion 3d is smaller than a reaction force transmitted to the operator during a period before the plug-side convex portions 4e of the outer contact pieces 4b pass over the receptacle-side convex portion 3d of the outer conductor portion 3b. Hence, with the connector structure according to this embodiment, the operator can determine whether or not the receptacle 3 and the plug 4 have been reliably connected electrically.

With the connector structure according to this embodiment, the relative positions of the first case 6 and the second case 8 in the direction orthogonal to the connector axial direction are determined in a state in which the receptacle 3 and plug 4 are fitted together and arranged coaxially. Hence, with the connector structure according to this embodiment, no increase of impedance arises due to misalignment between the receptacle 3 and the plug 4.

As described above, the connector structure according to the present invention has an effect of being able to reliably connect the receptacle and the plug electrically even when the assembly tolerance of a first member, to which the receptacle is fixed, and a second member, to which the plug is fixed, is large in the connector axial direction and in a direction orthogonal to the connector axial direction. As a result, the connector structure is useful for various substrate assemblies, etc.

REFERENCE SIGNS LIST 3 receptacle
3a central conductor portion
3b outer conductor portion
3d receptacle-side convex portion
4 plug
4a inner contact piece
4b outer contact piece
4e plug-side convex portion
6 first case (first member)
8 second case (second member)

The invention claimed is:
1. A connector structure comprising:
a receptacle that is fixed to a first case; and
a plug that is fixed to a second case and is fitted into the receptacle, with the second case being fitted into the first case, wherein:
the receptacle has a central conductor portion, a tubular outer conductor portion that concentrically surrounds the central conductor portion, and a receptacle-side convex portion that extends in a connector circumferential direction and is formed on a top end portion of the outer conductor portion;
the plug has a plurality of inner contact pieces that make contact with an outer peripheral surface of the central conductor portion when the plug is fitted into the receptacle, a plurality of outer contact pieces that extend in a connector axial direction on an outer peripheral surface of the outer conductor portion with intervals therebetween, and plug-side convex portions that are freely displaceable in the connector axial direction in a state of being in surface contact with the outer peripheral surface of the outer conductor portion and are formed on the outer contact pieces;

with the receptacle and the plug fitted together in a coaxial state, a clearance is formed between the first case and the second case, at a fitting section of the first case and the second case, in a direction orthogonal to an axis of the receptacle such that, within a range of the clearance, changes in relative positions between the first case and the second case in the direction orthogonal to the axis of the receptacle can be allowed; and the second case is assembled with the first case within a range in which the second case is freely displaceable in the connector axial direction.

2. The connector structure according to claim 1, wherein, after the receptacle and the plug are fitted together in the coaxial state, while maintaining the state, the first case and the second case are fixed to each other.

3. The connector structure according to claim 1, wherein the first case allows a unit to be accommodated therein, and the first case has an opening that allows the unit to be inserted thereinto.

4. The connector structure according to claim 3, wherein the second case has a guide portion that is fitted into the opening, and the guide portion is fitted into the opening so that the opening is closed by the second case.

5. The connector structure according to claim 1, wherein the first case and the second case are fixed to each other so that water tightness is secured around the whole circumference of the fitting section.

6. The connector structure according to claim 1, wherein the first case and the second case are fixed to each other by ultrasonic bonding.

7. The connector structure according to claim 1, wherein the first case and the second case are fixed to each other using an adhesive.

8. A camera comprising the connector structure according to claim 1, wherein the first case accommodates a lens unit.

9. The connector structure according to claim 1, wherein, when the first case and second case are fitted together, there is a clearance between a tip portion of the first case and the second case in the direction orthogonal to the axis of the receptacle and a clearance between the first case and a tip portion of the second case in the direction orthogonal to the axis of the receptacle.

* * * * *